De W. C. SAGE.
DRAIN AND SEWER PIPE.
No. 171,245.  Patented Dec. 21, 1875.
Fig: 1.
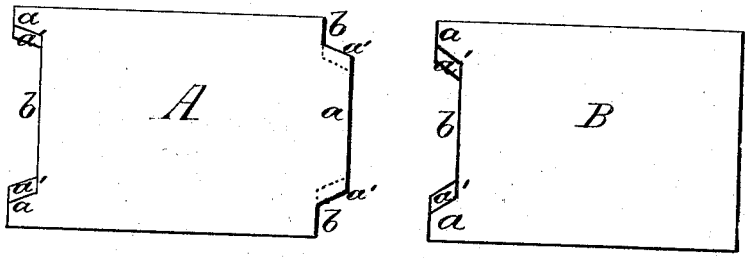
Fig: 2.
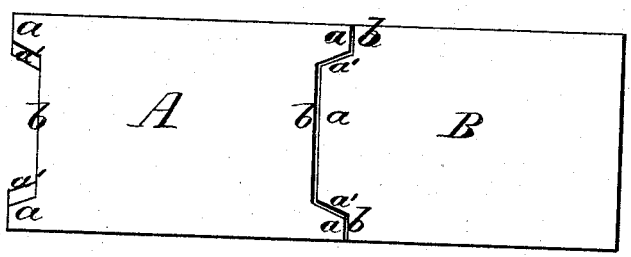
Fig: 3.
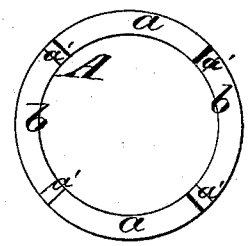
Witnesses,
Jno. S. Slater
W. J. Chaffee
Inventor
DeWitt C. Sage
by
Mason Fenwick & Lawrence
Attorneys.

UNITED STATES PATENT OFFICE.

DE WITT C. SAGE, OF CROMWELL, CONNECTICUT.

IMPROVEMENT IN DRAIN AND SEWER PIPES.

Specification forming part of Letters Patent No. 171,245, dated December 21, 1875; application filed November 18, 1875.

*To all whom it may concern:*

Be it known that I, DE WITT C. SAGE, of Cromwell, in the county of Middlesex and State of Connecticut, have invented a new and useful Improvement in Drain and Sewer Pipe; and I do hereby declare the following to be a full, clear, and exact description thereof, reference being had to the accompanying drawings making part of this specification, in which—

Figure 1 represents an elevation of two sections of my improved drain or sewer pipe separated; Fig. 2, an elevation of the same united, and Fig. 3 is an end view of a section of pipe showing my invention.

The object of my invention is to so construct a drain or sewer pipe of clay, cement, or other similar substances, as will enable the sections to be laid and held securely in position, their ends forming smooth tight joints, without danger of lateral displacement, and without the use of rings, sockets, or the like, as in case of the pipes now in ordinary use.

Heretofore, drain and sewer pipes have been constructed with one end tapered or thinned down, so as to fit into the end of the next succeeding section, thus rendering the pipe of varying thickness and thinness where strength is most needed to insure against breakage from the sinking or settling of the joints after the pipe has been laid; or the pipe has been made with a shoulder "spun" or pressed up on one end, the inner portion of such shoulder presenting a chamber of sufficient diameter to receive one end of a section of the pipe; but this last method of forming the pipe is open to the same objections as may be urged against forming pipe with tapering ends, viz., liability to breakage, which is greatly augmented by the determined line of fracture produced by the formation of the shoulder. Another objection to the shouldered pipe is the difficulty and expense of manufacturing perfect work. Rings have also been used to unite the sections and cover the joint; but these are also expensive, and are easily broken in handling, and thus rendered comparatively if not wholly useless.

The nature of my invention consists in dispensing with the tapered and shouldered ends, and also the rings, and, instead thereof, providing the ends of the sections of pipe with tongues and recesses, by means of which the two pieces are united and held from lateral displacement.

In the drawings, A B represent two sections of drain or sewer pipe, cylindrical in form and of any proper or convenient diameter and length. $a\ a$ are tongues formed upon the ends of the pipe, upon opposite sides of the diametric center thereof; and $b\ b$ are recesses between the tongues. The edges $a'$ of the tongues $a$ are beveled from their bases outwardly, and so formed as to correspond with lines drawn radially through the diameter of the cylinder forming the pipe.

I make my improved drain or sewer pipe in the following manner: I take the material of which it is to be composed, and mold it upon a mandrel of the required shape and diameter, and divide the pipe into sections of the proper length by a wire cutter. I then take a tool constructed with three cutting-edges, one of which is adapted to correspond to the cylindrical shape of the mandrel, the other two being straight and set at an angle, the three being so arranged with reference to each other as will enable the tool, when applied to the circumference of the pipe at its end, to cut out a portion thereof corresponding to the tongue $a$, as shown by the recesses $b$.

By thus constructing drain or sewer piping I am enabled to secure a pipe of uniform thickness throughout its entire length, presenting, when laid, a uniform and even surface, with a smooth close joint, the sections being dovetailed together, and which is produced at comparatively small cost. When once down it is not liable to lateral displacement, less liable to breakage than the kinds of pipe in ordinary use, and in every way better adapted to the purposes for which it is intended.

Having thus described my invention, what I claim, and desire to secure by Letters Patent, is—

As a new article of manufacture, sewer or drain pipe sections, having their ends constructed with tongues and recesses to receive the tongues, substantially as described.

DE WITT C. SAGE.

Witnesses:
E. J. MIDDLETON, Jr.,
JNO. S. SLATER.